(12) United States Patent
Zhu et al.

(10) Patent No.: US 10,599,065 B1
(45) Date of Patent: Mar. 24, 2020

(54) DEVELOPER SUPPLY CONTAINER WITH DISCHARGE OF DEVELOPER USING GAS

(71) Applicant: JIANGXI KILIDER TECHNOLOGY CO., LTD, Shangrao (CN)

(72) Inventors: Jinjun Zhu, Shangrao (CN); Zhongxi Li, Shangrao (CN); Jiabing He, Shangrao (CN)

(73) Assignee: JIANGXI KILIDER TECHNOLOGY CO., LTD, Shangrao (CN)

( * ) Notice: Subject to any disclaimer, the term of this patent is extended or adjusted under 35 U.S.C. 154(b) by 0 days.

(21) Appl. No.: 16/442,587

(22) Filed: Jun. 17, 2019

(30) Foreign Application Priority Data

Jan. 14, 2019 (CN) .......................... 2019 1 0029472
May 20, 2019 (CN) .......................... 2019 1 0418810

(51) Int. Cl.
| | | |
|---|---|---|
| *G03G 15/08* | (2006.01) | |
| *B65B 1/00* | (2006.01) | |
| *G01F 11/00* | (2006.01) | |
| *B65B 1/26* | (2006.01) | |
| *B65B 1/38* | (2006.01) | |

(Continued)

(52) U.S. Cl.
CPC ........... *G03G 15/0868* (2013.01); *B65B 1/26* (2013.01); *B65B 1/38* (2013.01); *G01F 11/18* (2013.01); *G01F 11/282* (2013.01); *G03G 15/087* (2013.01); *G03G 2215/0668* (2013.01)

(58) Field of Classification Search
CPC ............. G03G 15/0868; G03G 15/087; G03G 2215/0663; G03G 2215/0665; G03G 2215/0668; G03G 2215/0685; B65B 1/26; B65B 1/38; B65B 3/14; B65B 3/32;

(Continued)

(56) References Cited

U.S. PATENT DOCUMENTS 9,360,799 B2 * 6/2016 Itabashi ............. G03G 15/0877
2006/0261095 A1 * 11/2006 Rebordosa ............ A47J 31/404
222/234

(Continued)

FOREIGN PATENT DOCUMENTS

| JP | 2007225865 A | * | 9/2007 |
| JP | 2012098603 A | * | 5/2012 |

(Continued)

*Primary Examiner* — Robert B Beatty
(74) *Attorney, Agent, or Firm* — Bayramoglu Law Offices LLC (57) ABSTRACT

A developer supply container includes a rotating container for conveying a developer and an intermittent regulator for intermittently supplying gas into the rotating container and regulating an internal pressure of the rotating container. A fixed amount of gas is intermittently supplied by the intermittent regulator to the gas mixing space and is discharged from the powder discharging port after the fixed amount of gas is mixed with the developer. Since the intermittent regulator can periodically supply the fixed amount of gas to the gas mixing space, the fixed amount of gas ensures a stable gas pressure inside the developer supply container. The developer supply container can continuously and stably replenish the developer into the image forming device under any storage or operating environment. The air pressure of the developer supply container is maintained at a stable level and a high precision replenishment amount of the developer is achieved.

16 Claims, 5 Drawing Sheets

(51) Int. Cl.
*G01F 11/18* (2006.01)
*G01F 11/28* (2006.01)

(58) Field of Classification Search
CPC ........ B65B 37/14; G01F 11/003; G01F 11/18;
G01F 11/40; G01F 11/282; G01F 13/001
USPC ............ 399/262, 263; 222/209, 401, DIG. 1
See application file for complete search history.

(56) References Cited

U.S. PATENT DOCUMENTS

| | | | |
|---|---|---|---|
| 2007/0048029 A1* | 3/2007 | Takuwa | G03G 15/0872 399/262 |
| 2013/0209140 A1* | 8/2013 | Murakami | G03G 15/0875 399/258 |
| 2014/0153974 A1* | 6/2014 | Jimba | G03G 15/0879 399/262 |

FOREIGN PATENT DOCUMENTS

| | | | | |
|---|---|---|---|---|
| JP | 2014186138 A | * | 10/2014 | ............ G03G 15/08 |
| JP | 2014240915 A | * | 12/2014 | |

* cited by examiner

DEVELOPER SUPPLY CONTAINER WITH DISCHARGE OF DEVELOPER USING GAS

CROSS REFERENCE TO THE RELATED APPLICATIONS

This application is based upon and claims priority to Chinese Patent Application No. 2019100294722, filed on Jan. 14, 2019, and Chinese Patent Application No. 2019104188101, filed on May 20, 2019, the entire contents of which are incorporated herein by reference.

TECHNICAL FIELD

The present invention relates to the field of developing equipment, and particularly to a developer supply container.

BACKGROUND

According to the prior art, the image forming device includes an image carrier, a developing device, and a developer supply container for accommodating the developer. The developer supply container is provided with a developer discharging port for supplying the developer to the developing device.

When the developer is discharged from the developer supply container, a certain amount of air is required to enter the developer supply container to enhance the fluidity of the developer and the stability of the flow rate. Currently known developer supply containers on the market generally use a supply system where a bellows pump is used to assist the discharge of the developer. For example, Chinese Patent Publication No. CN103250102B discloses a developer supply container and a developer supply system where an appropriate amount of developer is discharged from the developer supply container to the developer replenishing device from the initial stage. The developer supply container mountable/detachable on the developer replenishing device includes: a container body for accommodating the developer; a discharging port for discharging the developer stored in the container body; a holding member to which a driving force is input from the developer replenishing device; a pumping part which is operated according to the driving force received by the holding member to repeatedly and alternately switch the internal pressure of the container body between a state with a pressure lower than the ambient pressure and a state with a pressure higher than the ambient pressure; and a managing part composed of the holding member and a locking member for managing the position of the pump part at the start of the operation, so that air is drawn into the container body from the discharging port during the period of the first operation cycle of the pump part. The developer supply container provided by the above patent can achieve a pressure inside the developer supply container lower than ambient pressure by the driving of the pump, so that the air flows into the developer replenishing container, thus enhancing the fluidity of the developer. The pressure inside the developer supply container also may be higher than the ambient pressure with the driving of the pump, so that the developer can be discharged and intermittently supplied to the developer.

However, the developer supply container of the above structure often causes the situation where the developer is over compacted by slight impact between the developer and the developer supply container due to the vibration during the transportation or storage. When the developer is in a compacted state, a large amount of developer may be completely discharged at one time when the developer is discharged, which is generally known as a gushing phenomenon. In addition, the developer supply container of the above structure often uses a single developer discharging port for alternate air inhale and exhale during operation. Such an air inhale and exhale method will slow down the discharge speed of the developer in a certain extent, and transport the developer at the nearby region of the developer discharging port into the developer supply container while inhaling air from the developer discharging port, thereby causing the lack of force for discharging the developer.

SUMMARY

In order to overcome the drawbacks of the prior art, it is an objective of the present invention to provide a developer supply container which can continuously and stably supplement the developer to an image forming device under any storage environment or operating environment, and effectively maintain a stable pressure for the developer supply container, thereby achieving a high precision replenishment amount of the developer.

To achieve this objective, the present invention provides the following technical solutions.

The present invention provides a developer supply container which includes a rotating container for conveying a developer, and an intermittent regulator for intermittently supplying gas into the rotating container and regulating an internal pressure of the rotating container. One end of the rotating container is provided with a powder discharging bin, and a part of an inner space of the powder discharging bin forms a gas mixing space for accommodating the developer. A bottom of the powder discharging bin is provided with a powder discharging port for discharging the developer, and the powder discharging port is located below the gas mixing space. The intermittent regulator intermittently supplies a fixed amount of gas to the gas mixing space, the developer in the gas mixing space follows the fixed amount of gas to be discharged from the powder discharging port after the fixed amount of gas is mixed with the developer. Since the intermittent regulator can periodically supply the fixed amount of gas to the gas mixing space, the fixed amount of gas can effectively ensure a stable air pressure inside the developer supply container. The circumstances of higher or lower air pressure inside the developer supply container do not tend to occur like the case of using a pump, thereby ensuring that the developer does not become over compacted, i.e., no gushing phenomenon occurs, and realizing a high precision replenishment amount of the developer.

As a further improvement of the present invention, the rotating container includes a connecting cylinder and a receiving drum. One end of the connecting cylinder is rotatably connected to one end of the powder discharging bin, and the other end of the connecting cylinder is connected to the receiving drum by a threaded connection. The connecting cylinder is configured to connect to the powder discharging bin and the receiving drum, effectively. After the connecting cylinder and the receiving drum are connected into one single piece by the threaded connection, when the connecting cylinder and the receiving drum rotate, the developer continuously flows to the powder discharging bin, thereby ensuring a continuous supply of the developer in the powder discharging bin.

As a further improvement of the present invention, the intermittent regulator includes a cam piston having a cam surface, one end of the connecting cylinder is provided with a first stirring plate, and an end surface of one end of the first stirring plate is in contact with the cam surface of the cam piston. When the first stirring plate rotates, the first stirring plate drives the cam piston to perform a reciprocating translational motion along an inner wall of the powder discharging bin. In order to supply power to the intermittent regulator, since the first stirring plate drives the cam piston to perform the reciprocating translational motion along the inner wall of the powder discharging bin, the first stirring plate can rotate along with the connecting cylinder, so as to continuously push the cam piston to perform the reciprocating translational motion.

As a further improvement of the present invention, the intermittent regulator further includes a spring, the cam surface is located at one side of the cam piston, the other side of the cam piston is provided with at least one sliding rod. The other end of the powder discharging bin is provided with a cover, a sliding column corresponding to the sliding rod is provided on an inner wall of the cover, one end of the sliding rod is inserted into a sliding groove inside the sliding column, and the sliding rod matches with the sliding column in a sliding manner. The spring is sleeved on the sliding column, one end of the spring is in contact with the cover, and the other end of the spring is in contact with a side wall of the other side of the cam piston. Since the first stirring plate merely rotates without an axial displacement, after an axial displacement of the cam piston occurs, the cam piston is returned under an action of the spring, thereby ensuring a smooth proceeding of the reciprocating motion of the cam piston. In addition, the sliding rod and the sliding column further have a guiding function, which effectively ensures the stability and reliability during the reciprocating motion of the cam piston and reduces the possibility of deviation in the reciprocating motion of the cam piston.

As a further improvement of the present invention, an inner wall of the other side of the cam piston, the inner wall of the powder discharging bin, and the inner wall of the cover enclose a gas storage space for accommodating the fixed amount of gas. A middle part of the cam piston is provided with a first unidirectional patch valve for the fixed amount of gas to enter the gas mixing space, unidirectionally, and a middle part of the cover is provided with a second unidirectional patch valve for the fixed amount of gas to enter the gas storage space, unidirectionally. When an end portion of the first stirring plate moves from a low point to a top point of the cam surface of the cam piston, the first unidirectional patch valve is opened because an air pressure in the gas storage space is higher than an air pressure in the gas mixing space, so that the fixed amount of gas flows from the gas storage space to the gas mixing space. When the end portion of the first stirring plate moves from the top point to the low point of the cam surface of the cam piston, the second unidirectional patch valve is opened because an external atmospheric pressure outside the powder discharging bin is greater than air pressure in the gas storage space, so that the fixed amount of gas flows from an exterior of the powder discharging bin to the gas storage space. Since a travel range of the reciprocating motion of the cam piston is determined by the top point and the low point of the cam surface, with a constant external atmospheric pressure, gas flowing into the gas storage space has a fixed amount, and the gas substantially has a constant pressure. As a result, it is effectively ensured that the air pressure inside the developer supply container is in an appropriate range, the gushing phenomenon will not occur, the high precision replenishment amount of the developer is achieved, and the stable gas pressure makes the discharging force of the developer constant.

As a further improvement of the present invention, a drum connecting port is provided on the connecting cylinder near a joint between the receiving drum and the connecting cylinder. A drive gear for driving a rotation of the connecting cylinder and the receiving drum is provided on the drum connecting port. An internal thread is provided inside the drum connecting port for screwing the receiving drum into the connecting cylinder to facilitate an installation and disassembly of the receiving drum.

As a further improvement of the present invention, the internal thread inside the connecting cylinder and a thread on the receiving drum are connected to each other in a left-hand thread connection. A rotation direction of the drive gear is consistent with a screwing direction of the left-hand thread connection. Since the connecting cylinder rotates together with the receiving drum, during the rotation, it should ensure that the rotation direction of the driving gear is consistent with the screwing direction of the left-hand thread connection, so as to ensure that the threaded connection between the connecting cylinder and the receiving drum is not being loosened due to the rotation of the connecting cylinder and the receiving drum.

As a further improvement of the present invention, a second stirring frame is provided inside the connecting cylinder, and the other end of the first stirring plate is fixedly connected to a distal end of the second stirring frame. The second stirring frame is located inside the connecting cylinder and is matched with the connecting cylinder in a plug-in manner. The second stirring frame can effectively connect the first stirring plate and a third stirring plate and can further assist the conveying of the developer in the connecting cylinder. The developer is conveyed into the gas mixing space between the connecting cylinder and the powder discharging bin.

As a further improvement of the present invention, the other end of the connecting cylinder is provided with a plurality of third stirring plates, and one end of each of the third stirring plates is fixedly connected to an initial end of the second stirring frame. The other end of each of the plurality of third stirring plates is a free end and is inserted into the receiving drum. One end of the receiving drum has a tapered neck part, and the plurality of third stirring plates can effectively convey the developer at the tapered neck part into the connecting cylinder to ensure a smooth flow of the developer from the receiving drum to the connecting cylinder.

As a further improvement of the present invention, the plurality of the third stirring plates are provided in pairs, and a straight line distance between farthest ends of two third stirring plates of each pair is greater than a diameter of a drum body of the receiving drum. The straight line distance between the farthest ends of the two third stirring plates being greater than the diameter of the drum body of the receiving drum makes sure that the third stirring plates are in a close fit with an inner wall of the tapered neck part of the receiving drum, so a gap between the third stirring plates and the inner wall of the tapered neck part can be avoided and the situation that the force for conveying the developer is insufficient can be avoided.

As a further improvement of the present invention, an opening angle is formed between the two third stirring plates of each pair, and a value of the opening angle should be consistent with a value of a cone angle of the tapered neck part of the receiving drum. The value of the opening angle between the two third stirring plates of each pair may be slightly larger than the value of the cone angle of the tapered neck part of the receiving drum. This arrangement effectively ensures that the third stirring plates are fitted along the inner wall of the tapered neck part, so the developer can be efficiently conveyed to the connecting cylinder.

As a further improvement of the present invention, the second stirring frame is configured as a multi-layer spiral stirring plate structure, at least one sliding strip having an elongated shape is provided at an outer side of the multi-layer spiral stirring plate structure, and at least one sliding groove matched with the sliding strip is provided inside the connecting cylinder. The second stirring frame is detachably connected to the connecting cylinder by a sliding of the at least one sliding strip and the at least one sliding groove. Since the first stirring plate and the plurality of the third stirring plates are all fixed on the second stirring frame, the plug-in connection between the second stirring frame and the connecting cylinder can be realized by the sliding of a plurality of sliding strips and a plurality of sliding grooves, so the detachable connection between the stirring plate component and the connecting cylinder can be realized easily.

As a further improvement of the present invention, a plurality of guiding protrusions for conveying the developer are provided on the receiving drum. When the receiving drum rotates, the plurality of guiding protrusions drive the developer to move toward one end of the receiving drum. When the receiving drum rotates, the plurality of guiding protrusions generate a certain driving force for the developer, and a component of the driving force can push the developer to displace in an axial direction, so that the developer can move to the joint of the receiving drum and the connecting cylinder.

As a further improvement of the present invention, a first sealing ring is provided at a sliding interface between the cam piston and the inner wall of the powder discharging bin, and the first sealing ring is sleeved in a sealing groove around a periphery of the cam piston.

As a further improvement of the present invention, one end of the connecting cylinder is located in the powder discharging bin, and one end portion of the connecting cylinder is provided with a second sealing ring.

As a further improvement of the present invention, the gas mixing space is configured as a closed space composed of the first sealing ring, the second sealing ring, the inner wall of the powder discharging bin, and the cam surface of the cam piston. The pressure inside the closed space is relatively constant, thereby ensuring a continual and steady flow of the developer.

As a further improvement of the present invention, both sides of the first stirring plate are provided with scrapers for scraping the developer on the inner wall of the powder discharging bin.

As a further improvement of the present invention, sides of the plurality of the third stirring plates are fitted with the inner wall of the tapered neck part of the receiving drum, so the developer can be efficiently conveyed to the connecting cylinder.

The present invention has the followings advantages.

The developer supply container provided by the present invention is provided with a rotating container for conveying the developer and an intermittent regulator for intermittently supplying the gas to the rotating container and adjusting the internal pressure of the rotating container to intermittently supply a fixed amount of gas to the gas mixing space. After the fixed amount of gas is mixed with the developer, the developer in the gas mixing space follows the fixed amount of gas and flows out from the powder discharging port. The developer supply container provided by the present invention can continuously and stably replenish the developer to the image forming device under any storage environment or operating environment, which can effectively maintain a stable pressure inside the developer supply container, and achieve a high precision replenishment amount for the developer. The present invention further provides a stirring plate component which functions well as a conveyor. The stirring plate component can make sure that the developer in the rotating container flows to the powder discharging bin continuously and stably, thereby ensuring an effective supply of the developer to the gas mixing space.

Reference numerals in the figures are described below:
1, rotating container; 2, intermittent regulator; 3, powder discharging bin; 31, gas mixing space; 32, powder discharging port; 11, connecting cylinder; 12, receiving drum; 211, cam surface; 21, cam piston; 41, first stirring plate; 22, spring; 23, sliding rod; 33, cover; 24, sliding column; 114, sliding groove; 25, gas storage space; 212, first unidirectional patch valve; 331, second unidirectional patch valve; 111, drum connecting port; 112, drive gear; 113, internal thread; 42, second stirring frame; 43, third stirring plate; 121, tapered neck part; 421, sliding strip; 122, guiding protrusion; 5, first sealing ring; 6, second sealing ring; and 411, scraper.

DETAILED DESCRIPTION OF THE EMBODIMENTS

The technical solution of the present invention will be further described below with reference to the accompanying drawings and specific embodiments.

Figure 1:
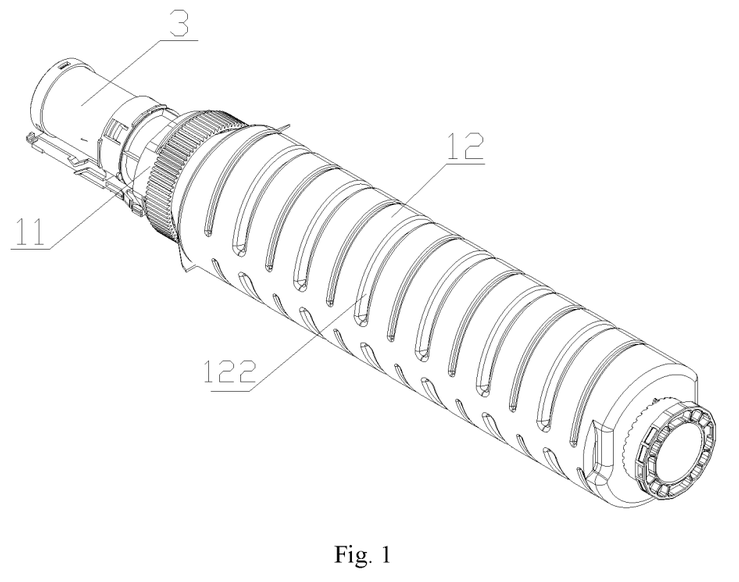
FIG. 1 is a perspective view of a developer supply container according to an embodiment of the present invention.
Figure 2:
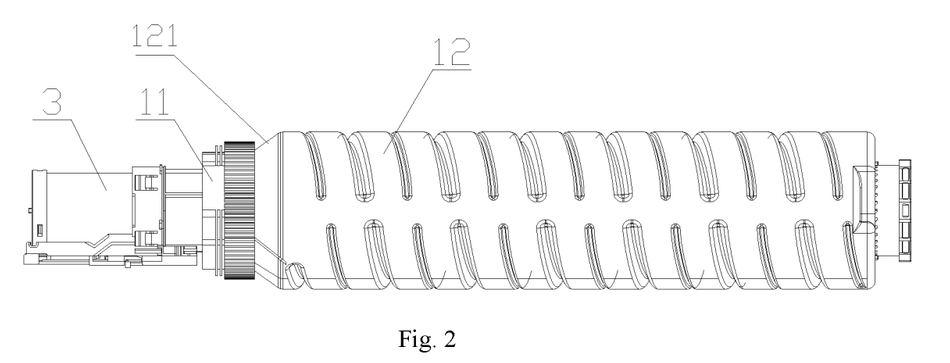
FIG. 2 is a front view of a developer supply container according to an embodiment of the present invention.
Figure 3:
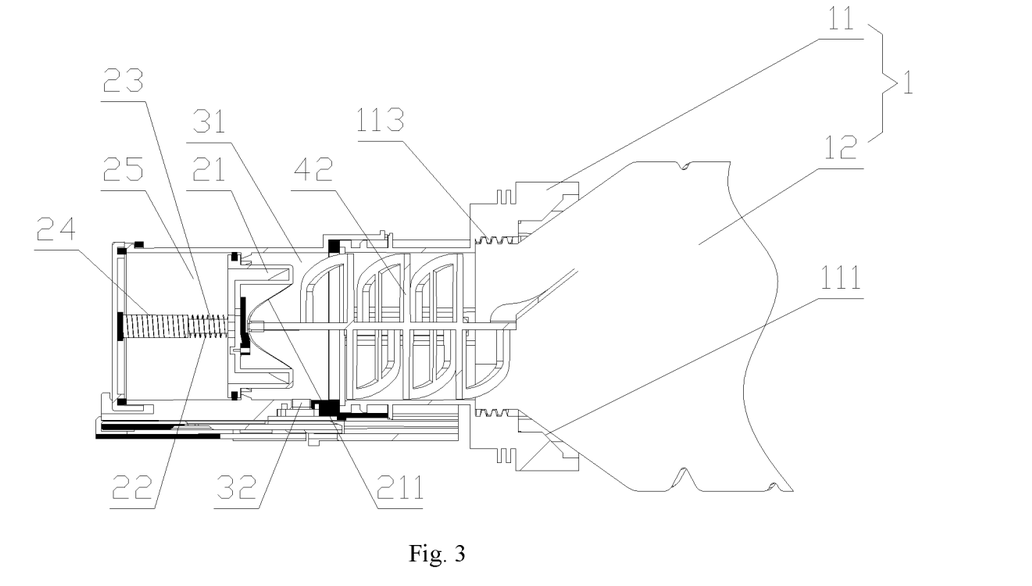
FIG. 3 is a partial cross-sectional view of a developer supply container according to an embodiment of the present invention.

As shown in FIGS. 1-3, a developer supply container provided by the present embodiment includes the rotating container 1 for conveying a developer, and the intermittent regulator 2 for intermittently supplying gas into the rotating container 1 and regulating an internal pressure of the rotating container 1. The rotating container 1 has a dual function of conveying and storing the developer. One end of the rotating container 1 is provided with the powder discharging bin 3, and a part of the internal space of the powder discharging bin 3 forms the gas mixing space 31 for accommodating the developer. The bottom of the powder discharging bin 3 is provided with the powder discharging port 32 for the developer to flow out, the powder discharging port 32 is located below the gas mixing space 31, and the powder discharging port 32 is located at the bottom of the powder discharging bin 3 as well. The developer is conveyed to the gas mixing space 31 in the powder discharging bin 3 under the rotation of the rotating container 1, while the intermittent regulator 2 intermittently supplies a fixed amount of gas to the gas mixing space 31. After the fixed amount of gas is mixed with the developer, the developer in the gas mixing space 31 follows the fixed amount of gas to discharge from the powder discharging port 32. Since the intermittent regulator 2 can periodically supply the fixed amount of gas to the gas mixing space 31, the fixed amount of gas can effectively ensure a stability of the air pressure inside the developer supply container, and the circumstances of higher or lower air pressure inside the developer supply container do not tend to occur like the case of using a pump, because the air charging and discharging of the pump have an inevitable lag. As a result, the developer is not over compacted, i.e., no gushing phenomenon will occur, and a high precision replenishment amount of the developer can be realized. Compared with the prior art, the intermittent regulator 2 in the present embodiment is capable of intermittently supplying the fixed amount of gas, while the intermittent period and the supply amount of the gas in the prior art are difficult to control, thus leading to over compact of the developer.

Figure 8:
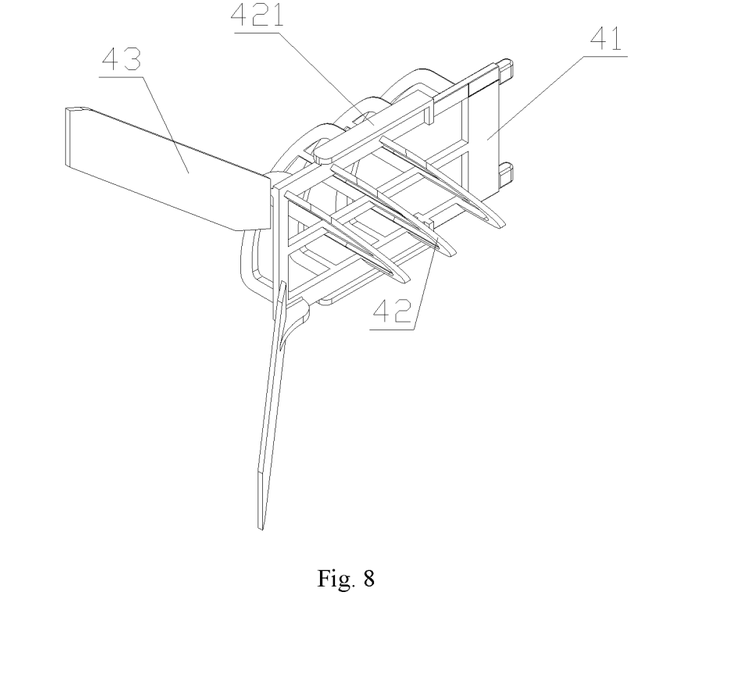
FIG. 8 is a perspective view of a stirring plate component of a developer supply container according to an embodiment of the present invention.

As shown in FIGS. 1-3, in order to facilitate the developer in the rotating container 1 to flow into the powder discharging bin 3, further, the rotating container 1 includes the connecting cylinder 11 and the receiving drum 12. One end of the connecting cylinder 11 is rotatably connected to one end of the powder discharging bin 3, and the other end of the connecting cylinder 11 is connected to the receiving drum 12 by a threaded connection. The connecting cylinder 11 is configured to effectively connect the powder discharging bin 3 and the receiving drum 12, while the connecting cylinder 11 facilitates the installation of the stirring plate component. As shown in FIG. 8, the stirring plate component is composed of the first stirring plate 41, the second stirring frame 42, and the third stirring plate 43 described below. After the connecting cylinder 11 and the receiving drum 12 are connected into a single piece by the threaded connection, when the connecting cylinder 11 and the receiving drum 12 rotate, the developer continuously flows to the powder discharging bin 3, thereby ensuring a continuous supply of the developer to the powder discharging bin 3.

As shown in FIGS. 3-7, in order to facilitate the stable reciprocating motion of the intermittent regulator 2 and obtain the power from the stirring plate component, further, the intermittent regulator 2 includes the cam piston 21 having the cam surface 211. One end of the connecting cylinder 11 is provided with the first stirring plate 41, and an end surface of one end of the first stirring plate 41 is in contact with the cam surface 211 of the cam piston 21. When the first stirring plate 41 rotates, the first stirring plate 41 drives the cam piston 21 to perform a reciprocating translational motion along an inner wall of the powder discharging bin 3, this is similar to the principle of the structure of the worm and the worm gear. However, in the present embodiment, the first stirring plate 41 is configured to rotate only, and the cam piston 21 reciprocally moves along the inner wall of the powder discharging bin 3 due to the unevenness of the cam surface 211. In order to supply power to the intermittent regulator 2, since the first stirring plate 41 drives the cam piston 21 to perform a reciprocating translational motion along the inner wall of the powder discharging bin 3, the first stirring plate 41 can rotate with the connecting cylinder 11, so as to continuously push the cam piston 21 to perform the reciprocating translational motion. Further preferably, the intermittent regulator 2 further includes the spring 22, the cam surface 211 is located at one side of the cam piston 21, and the other side of the cam piston 21 is provided with at least one sliding rod 23. The other end of the powder discharging bin 3 is provided with the cover 33, the sliding column 24 corresponding to the sliding rod 23 is provided on an inner wall of the cover 33, one end of the sliding rod 23 is inserted into the sliding groove 114 inside the sliding column 24, and the sliding rod 23 matches with the sliding column 24 in a sliding manner. The spring 22 is sleeved on the sliding column 24, one end of the spring 22 is in contact with the cover 33, and the other end of the spring 22 is in contact with a side wall of the other side of the cam piston 21. Preferably, the other side of the cam piston 21 is provided with two sliding rods 23. Two sliding columns 24 are provided on the inner wall of the cover 33. The two sliding rods 23 and the two sliding columns 24 can effectively ensure the stability. Obviously, three, four or other quantity of the sliding rods can satisfy the requirement as well. Since the first stirring plate 41 merely rotates without an axial displacement, after an axial displacement of the cam piston 21 occurs, the cam piston 21 should be returned under an action of the spring 22. Otherwise, the cam surface 211 will not be in contact with the end portion of the first stirring plate 41 all the time, and the returning action of the spring 22 can effectively ensure a smooth reciprocating motion of the cam piston 21. In addition, the sliding rod 23 and the sliding column 24 further have a guiding function, so the stability and reliability during the reciprocating motion of the cam piston 21 can be ensured, and the possibility of deviation of the reciprocating motion of the cam piston 21 can be reduced.

As shown in FIGS. 3-7 and FIG. 10, in order to ensure that a fixed amount of gas flows into the gas mixing space 31, further, an inner wall of the other side of the cam piston 21, the inner wall of the powder discharging bin 3, and the inner wall of the cover 33 enclose to form the gas storage space 25 for accommodating the fixed amount of gas. A middle part of the cam piston 21 is provided with the first unidirectional patch valve 212 for unidirectionally entering the fixed amount of gas to the gas mixing space 31, and a middle part of the cover 33 is provided with the second unidirectional patch valve 331 for unidirectionally entering the fixed amount of gas to the gas storage space 25. The first unidirectional patch valve 212 and the second unidirectional patch valve 331 are both unidirectional valves. The second unidirectional patch valve 331 allows the outside air to flow into the gas storage space 25 and stop the air from flowing out from the second unidirectional patch valve 331. After the gas storage space 25 is compressed, the gas in the gas storage space 25 can only enter the gas mixing space 31 from the first unidirectional patch valve 212. Similarly, the gas entering the gas mixing space 31 cannot flow back to the gas storage space 25. When the end portion of the first stirring plate 41 moves from a low point to a top point of the cam surface 211 of the cam piston 21, the first unidirectional patch valve 212 is opened because air pressure inside the gas storage space 25 is higher than the air pressure in the gas mixing space 31, so that the fixed amount of gas can flow from the gas storage space 25 to the gas mixing space 31. When the end of the first stirring plate 41 moves from the top point to the low point of the cam surface 211 of the cam piston 21, the second unidirectional patch valve 331 is opened because the external atmospheric pressure of the powder discharging bin 3 is greater than the air pressure inside the gas storage space 25, so that the fixed amount of gas flows from the outside of the powder discharging bin 3 to the gas storage space 25. Since the travel range of the reciprocating motion of the cam piston 21 is determined by the top point and the low point of the cam surface 211, when the external atmospheric pressure is constant, the gas flowing into the gas storage space 25 has a fixed amount, and the gas substantially has a constant pressure. Therefore, it is ensured that the air pressure inside the developer supply container is in an appropriate range, the gushing phenomenon will not occur, the high precision replenishment amount of the developer can be achieved, and the stability of the gas pressure ensures the constant discharging force of the developer.

In summary, specifically, when the intermittent regulator 2 is operated, the cam piston 21 is driven by the first stirring plate 41 and the spring 22 to perform the reciprocating motion at first. When the end portion of the first stirring plate 41 moves from the top point to the low point of the cam surface 211 of the cam piston 21, the second unidirectional patch valve 331 is opened because the external atmospheric pressure of the powder discharging bin 3 is greater than the air pressure inside the gas storage space 25, so that the fixed amount of gas flows from the outside of the powder discharging bin 3 to the gas storage space 25. When the end portion of the first stirring plate 41 moves from the low point to the top point of the cam surface 211 of the cam piston 21, since the air pressure inside the gas storage space 25 is higher than the air pressure in the gas mixing space 31, and the second unidirectional patch valve 331 stops the gas from flowing back to the outside atmosphere, the air pressure inside the gas storage space 25 rises, the first unidirectional patch valve 212 is opened, and the fixed amount of gas flows from the gas storage space 25 into the gas mixing space 31.

As shown in FIGS. 3-7, in order to facilitate the rotation of the rotating container 1, further, the drum connecting port 111 is provided on the connecting cylinder 11 at a position near a joint between the receiving drum 12 and the connecting cylinder 11. The drive gear 112 for driving a rotation of the connecting cylinder 11 and the receiving drum 12 is provided on the drum connecting port 111, and the drive gear 112 can be driven to rotate by the driving device. An internal thread 113 is provided inside the drum connecting port 111, the receiving drum 12 can be screwed into the connecting cylinder 11 to facilitate an installation and disassembly of the receiving drum 12. Further, the internal thread 113 inside the connecting cylinder 11 and the thread on the receiving drum 12 are connected to each other by a left-hand thread connection. A rotation direction of the drive gear 112 is consistent with a screwing direction of the left-hand thread connection. Since the connecting cylinder 11 rotates together with the receiving drum 12, during the rotation, it should be ensured that the rotation direction of the driving gear 112 is consistent with the screwing direction of the left-hand thread connection, so that the threaded connection between the connecting cylinder 11 and the receiving drum 12 will not become loosened due to the rotation of the connecting cylinder 11 and the receiving drum 12. A good seal is required at the joint of the connecting cylinder 11 and the receiving drum 12. The above structure can effectively ensure that the developer does not leak from the joint of the connecting cylinder 11 and the receiving drum 12 even if the developer supply container is used for a long period of time.

As shown in FIGS. 3-7, in order to facilitate the transportation of the developer inside the connecting cylinder 11, further, the second stirring frame 42 is provided inside the connecting cylinder 11, and the other end of the first stirring plate 41 is fixedly connected to the distal end of the second stirring frame 42. The second stirring frame 42 is located inside the connecting cylinder 11 and is connected to the connecting cylinder 11 in a plug-in manner. The second stirring frame 42 can effectively connect the first stirring plate 41 and the third stirring plate 43, and can further assist the transportation of the developer in the connecting cylinder 11, so the developer is conveyed into the gas mixing space 31 between the connecting cylinder 11 and the powder discharging bin 3. The first stirring plate 41 and the third stirring plate 43 are both fixed on the second stirring frame 42. The first stirring plate 41, the second stirring plate 42, and the third stirring plate 43 form a stirring plate component, and the stirring plate component as a whole is fixedly connected to the connecting cylinder 11 through the second stirring frame 42. More preferably, the other end of the connecting cylinder 11 is provided with a plurality of third stirring plates 43, and one end of each of the third stirring plates 43 is fixedly connected with the initial end of the second stirring frame 42. The other end of each of the plurality of third stirring plates 43 is a free end and is inserted into the receiving drum 12. In the present embodiment, preferably, the other end of the connecting cylinder 11 is provided with two third stirring plates 43, and other numbers of third stirring plates 43 are also acceptable. One end of the receiving drum 12 has the tapered neck part 121, and the plurality of third stirring plates 43 can effectively convey the developer at the tapered neck part 121 into the connecting cylinder 11 to ensure a smooth flow of the developer from the receiving drum 12 to the connecting cylinder 11. More preferably, in order to ensure that the two third stirring plates 43 are closely fitted with the inner wall of the tapered neck part 121 of the receiving drum 12, the plurality of the third stirring plates 43 are provided in pairs. A straight line distance between the farthest ends of the two third stirring plates 43 of each pair is greater than a diameter of a drum body of the receiving drum 12. The straight line distance between the farthest ends of the two third stirring plates 43 of each pair being greater than the diameter of the drum body of the receiving drum 12 can ensure that the third stirring plate 43 is closely fitted with an inner wall of the tapered neck part 121 of the receiving drum 12. Therefore, no gap is left between the third stirring plate 43 and the inner wall of the tapered neck part 121, and the situation of the lack of strength for conveying the developer is avoided. More preferably, an opening angle is formed between the two third stirring plates 43 of each pair, and a value of the opening angle should be consistent with a value of a cone angle of the tapered neck part 121 of the receiving drum 12. The value of the opening angle formed between the two third stirring plates 43 of each pair may also be slightly larger than the value of the cone angle of the tapered neck part 121 of the receiving drum 12. This arrangement effectively ensures that the third stirring plate 43 is fitted along the inner wall of the tapered neck part 121, so the developer can be efficiently conveyed to the connecting cylinder 11. More preferably, the sides of the plurality of third stirring plates 43 are fitted with the inner wall of the tapered neck part 121 of the receiving drum 12, so the developer can be effectively conveyed to the connecting cylinder 11. The force for conveying the developer at the tapered neck part 121 will be reduced with insufficient fitting.

Figure 9:
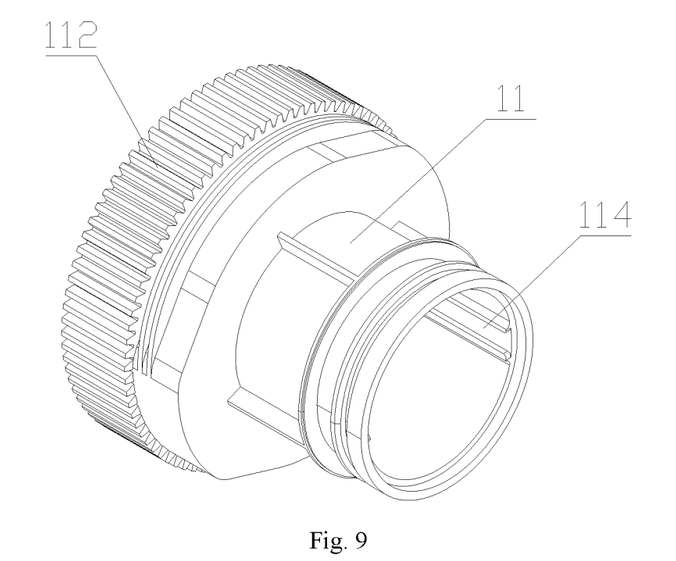
FIG. 9 is a perspective view of a connecting cylinder of a developer supply container according to an embodiment of the present invention.
Figure 10:
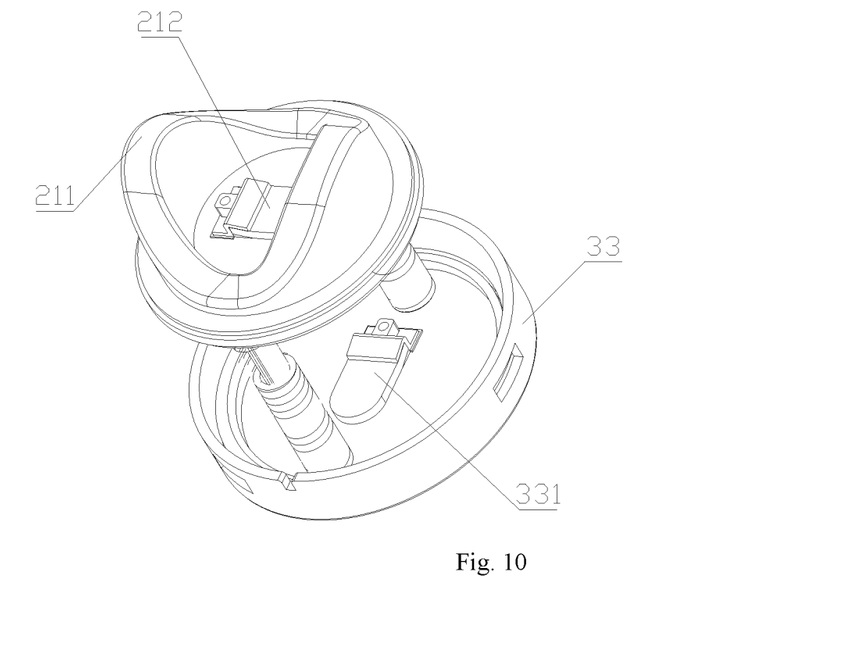
FIG. 10 is a perspective view of an intermittent regulator of a developer supply container according to an embodiment of the present invention.

As shown in FIGS. 8-9, in order to facilitate the fixed connection of the stirring plate component and the connecting cylinder 11, further, the second stirring frame 42 is configured as a multi-layer spiral stirring plate structure. At least one sliding strip 421 having an elongated shape is provided at the outer side of the multi-layer spiral stirring plate structure, and at least one sliding groove 114 matching with the sliding strip 421 is provided inside the connecting cylinder 11. The second stirring frame 42 is detachably connected to the connecting cylinder 11 by the sliding between the at least one sliding strip 421 and the at least one sliding groove 114. Since the first stirring plate 41 and the plurality of the third stirring plates 43 are all fixed on the second stirring frame 42, the plug-in connection between the second stirring frame 42 and the connecting cylinder 11 can be realized by the sliding between a plurality of sliding strips 421 and a plurality of sliding grooves 114, so the detachable connection between the stirring plate component and the connecting cylinder 11 can be realized in an easy way. This arrangement can greatly facilitate the installation of the stirring plate component.

Figure 4:
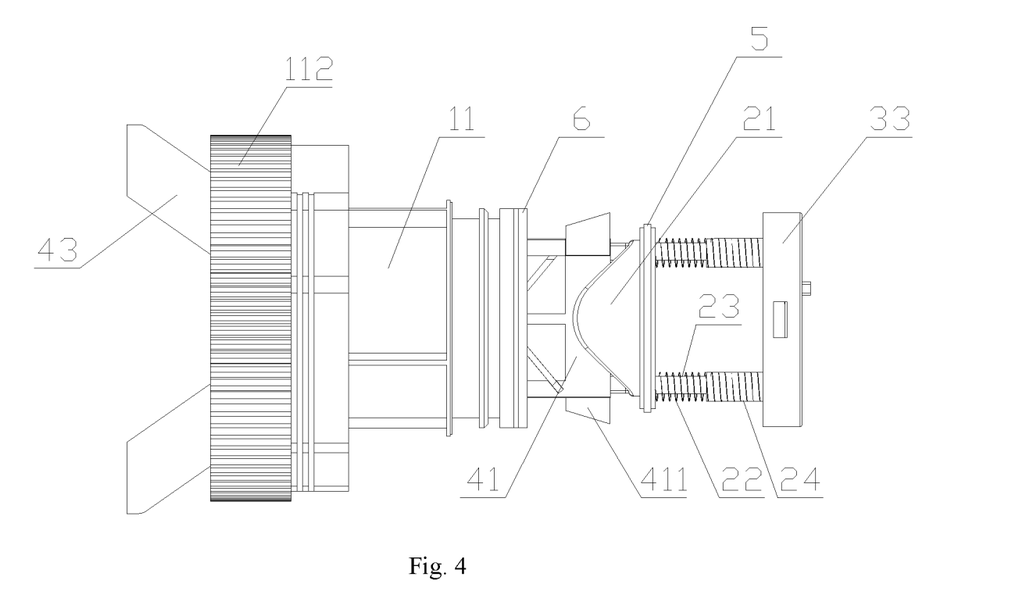
FIG. 4 is a side view showing an intermittent regulator and a connecting cylinder of a developer supply container according to an embodiment of the present invention (a structure of a powder discharging bin is not shown)
Figure 5:
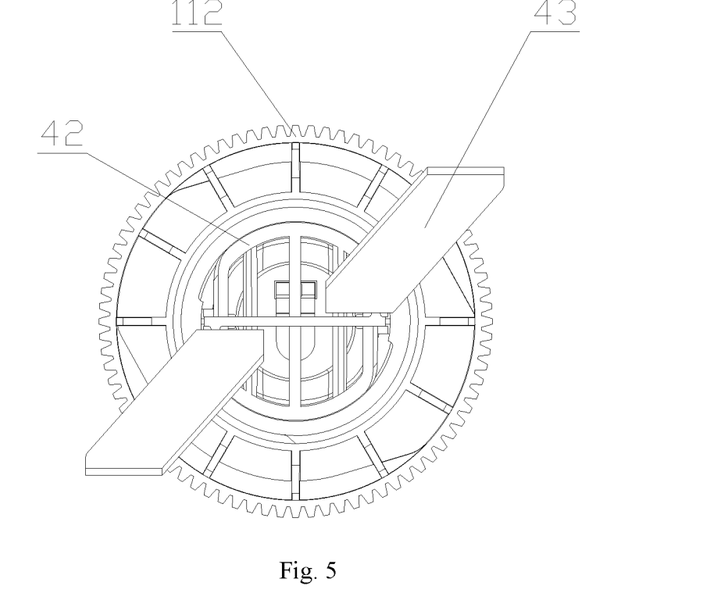
FIG. 5 is a front view showing an intermittent regulator and a connecting cylinder of a developer supply container according to an embodiment of the present invention (a structure of a powder discharging bin is not shown)
Figure 6:
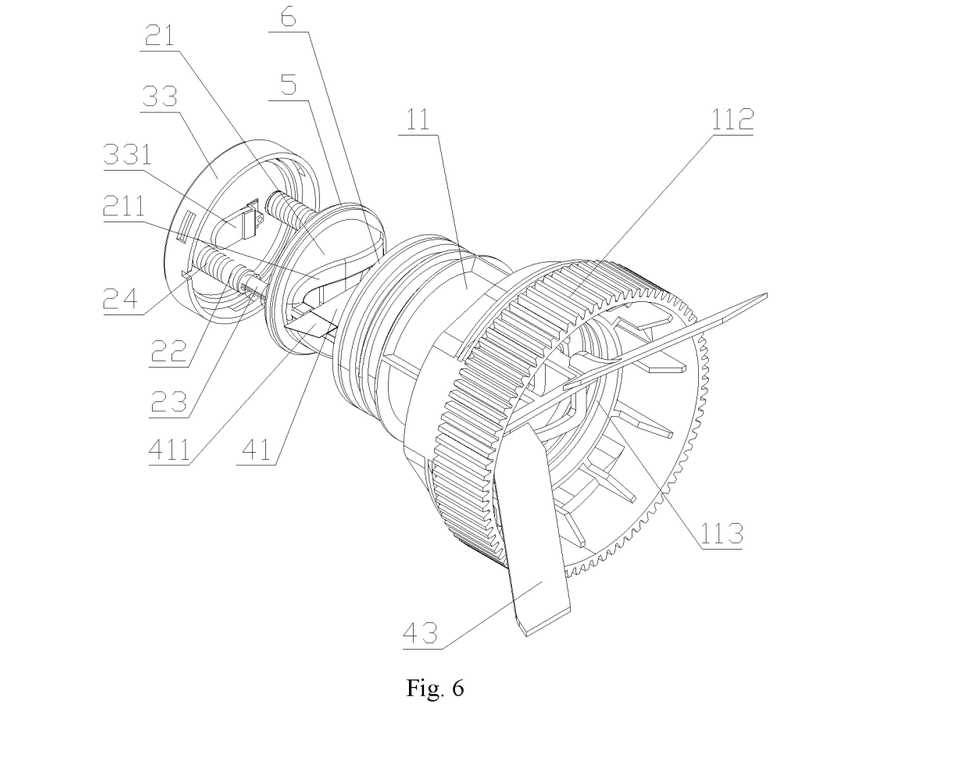
FIG. 6 is a left perspective view showing an intermittent regulator and a connecting cylinder of a developer supply container according to an embodiment of the present invention (a structure of a powder discharging bin is not shown)
Figure 7:
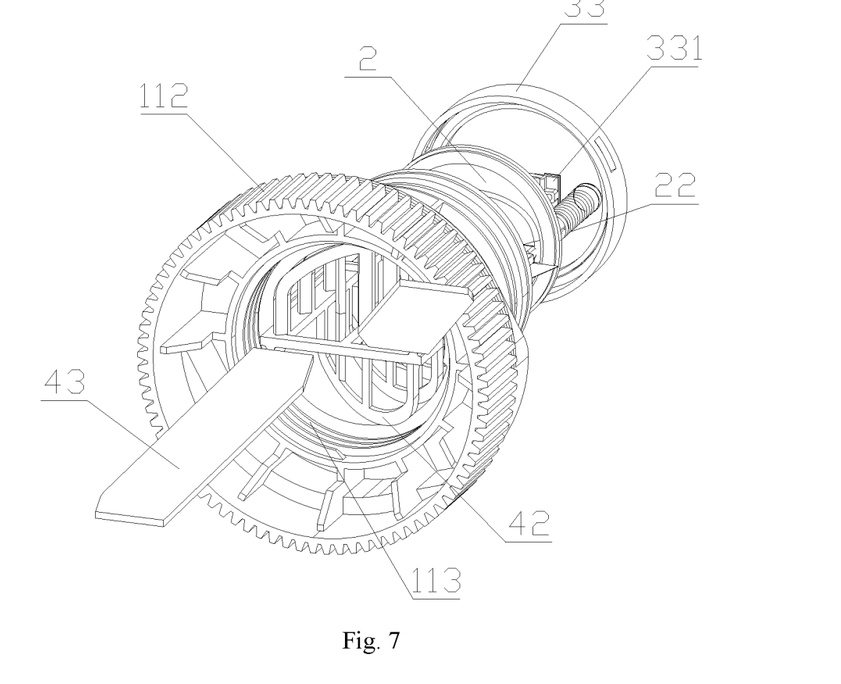
FIG. 7 is a right perspective view showing an intermittent regulator and a connecting cylinder of a developer supply container according to an embodiment of the present invention (a structure of a powder discharging bin is not shown)

As shown in FIG. 4 and FIG. 6, in order to scrap off the developer on the inner wall of the powder discharging bin 3, further, both sides of the first stirring plate 41 are provided with scrapers 411 for scraping off the developer on the inner wall of the powder discharging bin 3. When the first stirring plate 41 rotates, the developer on the inner wall of the powder discharging bin 3 can be scraped off by the scrapers 411, so it is ensured that the developer is not attached on the inner wall of the powder discharging bin 3.

As shown in FIGS. 1-2, in order to move the developer inside the receiving drum 12 to the one end of the receiving drum 12 in the longitudinal direction of the receiving drum 12, further, a plurality of guiding protrusions 122 for conveying the developer are provided on the receiving drum 12. When the receiving drum 12 rotates, the plurality of guiding protrusions 122 drive the developer to move toward one end of the receiving drum 12. When the receiving drum 12 rotates, the plurality of guiding protrusions 122 generate a certain driving force for the developer, and a component of the driving force can push the developer to displace in an axial direction, so that the developer can move to the joint of the receiving drum 12 and the connecting cylinder 11, namely, the developer can continuously flow toward the tapered neck part 121 of the receiving drum 12, and then enter the connecting cylinder 11 after being stirred by the third stirring plate 43.

In summary, when the rotating container 1 is in operation, the connecting cylinder 11 and the receiving drum 12 that are fixedly connected to each other are first driven to rotate by the driving gear 112. Under the rotation of the receiving drum 12, the developer is conveyed to the joint of the connecting cylinder 11 and the receiving drum 12. The third stirring plate 43 located at the joint of the connecting cylinder 11 and the receiving drum 12 guides the developer into the connecting cylinder 11. Then, the developer is conveyed from one end of the connecting cylinder 11 to the other end of the connecting cylinder 11, i.e. the position of the gas mixing space 31, through the second stirring frame 42. Then, the intermittent regulator 2 is driven by the first stirring plate 41 to intake gas intermittently, so that the fixed amount of gas is mixed with the developer. Finally, the developer mixed with the gas is smoothly discharged from the powder discharging port 32. It is effectively ensured that the developer is discharged continuously and stably.

As shown in FIGS. 3-7, in order to form a stable closed environment inside the developer supply container, especially at the position of the gas mixing space 31, further, the first sealing ring 5 is provided at a sliding interface between the cam piston 21 and the inner wall of the powder discharging bin 3, and the first sealing ring 5 is sleeved on a sealing groove around a periphery of the cam piston 21. More preferably, one end of the connecting cylinder 11 is located inside the powder discharging bin 3, and one end portion of the connecting cylinder 11 is provided with the second sealing ring 6. The gas mixing space 31 is configured as a closed space composed of the first sealing ring 5, the second sealing ring 6, the inner wall of the powder discharging bin 3, and the cam surface 211 of the cam piston 21. The pressure inside the closed space is relatively constant, thereby ensuring a continual and steady flow of the developer. In general, the discharge of the developer from the powder discharging port 32 causes a reduced air pressure inside the developer supply container, but the air supplied by the intermittent regulator 2 can effectively increase the air pressure inside the developer supply container. Therefore, the fixed amount of gas not only can be mixed with the developer to facilitate the discharge of the developer, but also can maintain the internal pressure of the developer supply container at a stable level, thereby avoiding the occurrence of developer compaction and gushing phenomenon.

In summary, the developer supply container provided by the present invention is provided with a rotating container for conveying the developer, and an intermittent regulator for intermittently supplying the gas into the rotating container and adjusting the internal pressure of the rotating container to intermittently supply a fixed amount of gas to the gas mixing space. The developer supply container provided by the present invention can continuously and stably replenish the developer into the image forming device under any storage environment or operating environment, so the air pressure of the developer supply container is effectively maintained at a stable level, and a high precision replenishment amount of the developer can be realized.

The present invention is described by preferred embodiments. It is apparent to those skilled in the art that various changes or equivalent substitutions can be made to these features and embodiments without departing from the spirit and scope of the present invention. The present invention is not limited by the specific embodiments disclosed herein, and other embodiments covered by the claims of the present application should be considered as falling within the scope of the present invention.

What is claimed is:
1. A developer supply container, comprising
a rotating container for conveying a developer, and
an intermittent regulator for intermittently supplying a gas into the rotating container and regulating an internal pressure of the rotating container;
wherein, an end portion of one end of the rotating container is provided with a powder discharging bin;
a part of an inner space of the powder discharging bin forms a gas mixing space for accommodating the developer;

a bottom of the powder discharging bin is provided with a powder discharging port for discharging the developer;

the powder discharging port is located below the gas mixing space;

the intermittent regulator is configured to intermittently supply a fixed amount of gas to the gas mixing space, and after the fixed amount of gas is mixed with the developer, the developer in the gas mixing space discharges from the powder discharging port with the fixed amount of gas, wherein, the rotating container comprises a connecting cylinder and a receiving drum;

one end of the connecting cylinder is rotatably connected to one end of the powder discharging bin; and an other end of the connecting cylinder is connected to the receiving drum by a threaded connection, wherein, the intermittent regulator comprises a cam piston having a cam surface;

the one end of the connecting cylinder is provided with a first stirring plate, an end surface of one end of the first stirring plate is in contact with the cam surface of the cam piston; and when the first stirring plate rotates, the first stirring plate drives the cam piston to perform a reciprocating translational motion along an inner wall of the powder discharging bin.

2. The developer supply container of claim 1, wherein, the intermittent regulator further comprises a spring;

the cam surface is located at one side of the cam piston;

an other side of the cam piston is provided with at least one sliding rod;

an other end of the powder discharging bin is provided with a cover;

a sliding column corresponding to the sliding rod is provided on an inner wall of the cover;

one end of the sliding rod is inserted into a sliding groove inside the sliding column; the sliding rod matches with the sliding column in a sliding manner; and the spring is sleeved on the sliding column, one end of the spring is in contact with the cover, and an other end of the spring is in contact with a side wall of the other side of the cam piston.

3. The developer supply container of claim 2, wherein, an inner wall of the other side of the cam piston, the inner wall of the powder discharging bin, and the inner wall of the cover enclose to form a gas storage space for accommodating the fixed amount of gas;

a middle part of the cam piston is provided with a first unidirectional patch valve for unidirectionally entering the fixed amount of gas into the gas mixing space;

a middle part of the cover is provided with a second unidirectional patch valve for unidirectionally entering the fixed amount of gas into the gas storage space;

when an end portion of the first stirring plate moves from a low point of the cam surface of the cam piston to a top point of the cam surface of the cam piston, the first unidirectional patch valve is opened because an air pressure inside the gas storage space is higher than an air pressure inside the gas mixing space, so that the fixed amount of gas flows from the gas storage space to the gas mixing space; when the end portion of the first stirring plate moves from the top point of the cam surface of the cam piston to the low point of the cam surface of the cam piston, the second unidirectional patch valve is opened because an external atmospheric pressure of the powder discharging bin is greater than the air pressure inside the gas storage space, so that the fixed amount of gas flows from an exterior of the powder discharging bin to the gas storage space.

4. The developer supply container of claim 1, wherein, a drum connecting port is provided on the connecting cylinder at a side of a joint between the receiving drum and the connecting cylinder; and a drive gear for driving a rotation of the connecting cylinder and the receiving drum is provided on the drum connecting port.

5. The developer supply container of claim 4, wherein, an internal thread inside the connecting cylinder and a thread on the receiving drum are connected to each other in a left-hand thread connection, and a rotation direction of the drive gear is consistent with a screwing direction of the left-hand thread connection.

6. The developer supply container of claim 1, wherein, a second stirring frame is provided inside the connecting cylinder, and an other end of the first stirring plate is fixedly connected to a distal end of the second stirring frame.

7. The developer supply container of claim 6, wherein, the other end of the connecting cylinder is provided with a plurality of third stirring plates;

one end of each of the third stirring plates is fixedly connected with an initial end of the second stirring frame; and an other end of each of the third stirring plates is a free end and is inserted into the receiving drum.

8. The developer supply container of claim 7, wherein, the plurality of the third stirring plates are provided in pairs; and a straight line distance between farthest ends of two third stirring plates of each pair of the plurality of the third stirring plates is greater than a diameter of a drum body of the receiving drum.

9. The developer supply container of claim 8, wherein, an opening angle is formed between the two third stirring plates of each pair of the plurality of the third stirring plates; and a value of the opening angle is equal to a value of a cone angle of a tapered neck part of the receiving drum.

10. The developer supply container of claim 6, wherein, the second stirring frame is configured as a multi-layer spiral stirring plate structure;

at least one sliding strip having an elongated shape is provided at an outer side of the multi-layer spiral stirring plate structure;

at least one sliding groove matching with the sliding strip is provided inside the connecting cylinder; and the second stirring frame is detachably connected to the connecting cylinder by sliding between the at least one sliding strip and the at least one sliding groove.

11. The developer supply container of claim 1, wherein, a plurality of guiding protrusions for conveying the developer are provided on the receiving drum; and when the receiving drum rotates, the plurality of guiding protrusions drive the developer to move toward one end of the receiving drum.

12. The developer supply container of claim 1, wherein, a first sealing ring is provided at a sliding interface between the cam piston and the inner wall of the powder discharging bin; and the first sealing ring is sleeved on a sealing groove at a periphery around the cam piston.

13. The developer supply container of claim 12, wherein,
the one end of the connecting cylinder is located in the powder discharging bin; and
one end portion of the connecting cylinder is provided with a second sealing ring.

14. The developer supply container of claim 13, wherein,
the gas mixing space is configured as a closed space formed by the first sealing ring, the second sealing ring, the inner wall of the powder discharging bin, and the cam surface of the cam piston.

15. The developer supply container of claim 1, wherein,
both sides of the first stirring plate are provided with scrapers for scraping the developer on the inner wall of the powder discharging bin.

16. The developer supply container of claim 7, wherein,
sides of the plurality of the third stirring plates are fitted with an inner wall of a tapered neck part of the receiving drum.

\* \* \* \* \*